United States Patent
Delgado et al.

(10) Patent No.: US 7,622,054 B2
(45) Date of Patent: Nov. 24, 2009

(54) LOW VOLATILE PHOSPHOROUS GELLING AGENT

(75) Inventors: Emil Delgado, Moore, SC (US); Bradley Keown, Honea Path, SC (US)

(73) Assignee: Ethox Chemicals LLC, Greenville, SC (US)

( * ) Notice: Subject to any disclaimer, the term of this patent is extended or adjusted under 35 U.S.C. 154(b) by 532 days.

(21) Appl. No.: 11/198,528

(22) Filed: Aug. 8, 2005

(65) Prior Publication Data
US 2007/0032387 A1    Feb. 8, 2007

(51) Int. Cl.
*C02F 5/10* (2006.01)
*C09K 8/64* (2006.01)
(52) U.S. Cl. .................. 252/182.35; 507/235; 507/238
(58) Field of Classification Search .................. 507/237, 507/238
See application file for complete search history.

(56) References Cited

U.S. PATENT DOCUMENTS

| | | | | |
|---|---|---|---|---|
| 4,622,155 A * | 11/1986 | Harris et al. | ................. | 507/238 |
| 5,807,812 A * | 9/1998 | Smith et al. | ................. | 507/238 |
| 6,511,944 B2 * | 1/2003 | Taylor et al. | ................. | 507/237 |
| 6,544,934 B2 * | 4/2003 | Taylor et al. | ................. | 507/238 |
| 7,066,262 B2 * | 6/2006 | Funkhouser | ................ | 166/300 |

* cited by examiner

*Primary Examiner*—James Seidleck
*Assistant Examiner*—John J Figueroa
(74) *Attorney, Agent, or Firm*—Isaac A. Angres

(57) ABSTRACT

Liquid hydrocarbons are gelled by the introduction of a phosphate ester and a crosslinking agent for use in oil recovery. Generally a proppant, delayed gel breaker and other modifiers are added to the gelled hydrocarbon to improve the oil recovery process. The phosphate ester used in this method and composition for oil recovery has low volatility and good stability during hydrocarbon distillation resulting in improved distillation efficiency in a refinery.

1 Claim, 1 Drawing Sheet

$C_8$ alcohol species $C_{10}$ alcohol species

Dowanol EPH (phenyl ether) species

C₈ alcohol species

C₁₀ alcohol species

Dowanol EPH (phenyl ether) species

LOW VOLATILE PHOSPHOROUS GELLING AGENT

BACKGROUND OF THE INVENTION

1. Field of the Invention

This invention relates to gelled liquid hydrocarbon fluids and methods of their use and preparation.

2. Description of the Prior Art

In order to maximize the amount of oil derived from an oil well a process known as hydraulic pressure stimulation or, more commonly, subterranean formation fracturing is often employed. Generally, a fluid is pumped under high pressure down the wellbore through a steel pipe having small perforations in order to create or perpetuate cracks in the adjacent rock. The fluid employed must be able withstand exceptionally high shear forces. Gelled liquids, particularly gelled hydrocarbons, are often employed. In gelling the hydrocarbon on-site it is also preferred that gellation occur as quickly as possible. In addition, delayed gel breakers are used to cause the fracturing fluid to revert back to a thin fluid.

High viscosity gelled hydrocarbon containing a proppant material such as sand is used in this stimulation process. Polyvalent metal salts of phosphoric acid esters have been used to gel the hydrocarbon materials for this process. References include U.S. Pat. No. 4,622,155 issued to Harris and U.S. Pat. No. 5,846,915 issued to Smith on this process. Polyvalent metal ions include ferric or aluminum ion in these references.

Rapid gellation of hydrocarbon liquids is also required when tanks or vessels containing such liquids are damaged during transit to avoid or reduce spillage and the resultant damage to the environment. A variety of other applications exist which require the rapid gellation of hydrocarbon liquids. Therefore, several means for gelling hydrocarbon liquids are disclosed in the prior art.

U.S. Pat. No. 5,417,287 to Smith et al. is directed to a method for fracturing a subterranean formation which involves adding to a hydrocarbon liquid (a) an organic phosphate of the formula $HPO_4$ RR' where R is an alkyl or alkaryl group having from 6 to 18 carbon atoms and R' is hydrogen or an aryl, alkaryl, or alkyl group having from 1 to 18 carbon atoms; and (b) a ferric salt.

European Patent Application No. 551021A1 to McCabe et al. is directed to gelling a hydrocarbon liquid by adding thereto an at least partially neutralized alkyl orthophosphate acid ester, a $C_8$-$C_{18}$ surface active amine and a $C_2$-$C_4$ monohydric alcohol. The surface active amine employed includes alkyl and alkanol amines having from about 8-18 carbon atoms, N-heterocyclic amines, alkyl substituted derivatives of such heterocyclics and mixtures thereof Amines having more than one nitrogen group are preferred and imidazoline such as that prepared from the reaction of a tall oil fatty acid with diethylenetriamine is most preferred.

U.S. Pat. No. 4,316,810 to Burnham is directed to a fracturing composition which is an aluminum salt of an oxaalkyl phosphate in an oil base liquid. Surface active agents are not disclosed.

U.S. Pat. No. 4,153,649 to Griffin is directed to the reaction product of a hydroxy ether and a pentavalent phosphorus compound and an alcohol. The hydroxy ether has the formula $ROR_1$ OH wherein R is a $C_1$ to $C_6$ alkyl group, $R_1$ is a $C_2$ or $C_3$ alkylene group and the total carbon atoms of $R_1$ and R range from 3 to about 8. The disclosed reaction product may be employed in the gelling of hydrocarbon liquids when used with a compound containing a multivalent metal cation.

U.S. Pat. No. 5,271,464 to McCabe is directed to a method of plugging or sealing a subterranean formation by introducing a rapidly gelling hydrocarbon thereto. To the hydrocarbon is added a first component which is an at least partially neutralized alkyl orthophosphate ester and a second component which is the reaction product of an aqueous source of aluminum or ferric ions and a $C_8$-$C_{18}$ surface active amine in the presence of a water miscible organic solvent. The surface active amine is as defined above for European Pat. Application No. 551021A1, also to McCabe. The water miscible organic solvent is generally a monohydric alcohol.

U.S. Pat. No. 3,494,949 to Monroe et al. is directed to an additive for improving the viscosity of motor oils which is generally an aluminum salt of an alkyl orthophosphate.

U.S. Pat. No. 2,983,678 to Pellegrini et al. is directed to an additive for lubricating oils which is generally a rare earth metal salt of a diester phosphate.

U.S. Pat. Nos. 6,004,908 and 6,147,034 are directed to a novel gel compositions for improved performance during fracturing.

In an article published at the Canadian International Petroleum Conference Petroleum Society by Taylor, et. al. on Jun. 8-10, 2004 entitled "Refinery Plugging by Residual Oil Gellant Chemicals in Crude: Understanding and Preventing the Problem through New Oil Gellant Chemistry" the role of tray plugging of the refinery distillation trays from the decomposition/volatile products of the phosphoric acid ester gelling additive was clearly detailed. This plugging causes down time at the refinery distillation facility leading to much higher costs and poorer quality.

Distillation trays in the temperature range of 230 to 290° C. produced the majority of volatile phosphorus compounds that condensed out of the gas phase and caused plugging of the holes in the trays.

Plugging of trays reduces the efficiency of distillation towers. In fact, if plugging becomes severe enough, it becomes necessary to shut down the refinery to clean the towers. Unscheduled refinery shutdowns can be extremely costly to refiners. It is also possible that phosphorus may still be present in some distillate streams such as the jet fuel draw.

U.S. Pat. Nos. 6,511,944 and 6,544,934 disclosed improved methods for fracturing subterranean formations using gelled liquid hydrocarbons which comprised the following steps: An improved gelled liquid hydrocarbon fracturing fluid is prepared comprised of a hydrocarbon liquid, a gelling agent comprised of a ferric iron or aluminum polyvalent metal salt of a phosphonic acid ester, a proppant material, water and an amount of a delayed gel breaker effective to break the gelled hydrocarbon fracturing fluid. The phosphoric acid ester utilized in the gelling agent which minimizes volatile phosphorus in refinery distillation towers has the formula

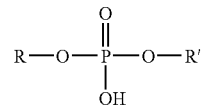

wherein R is an alkyl group having from about 8 to about 24 carbon atoms and R' is an alkyl group having from about 1 to about 4 carbon atoms. After the gelled liquid hydrocarbon fracturing fluid is prepared, the subterranean formation to be fractured is contacted with the gelled liquid hydrocarbon fracturing fluid under conditions effective to create at least one fracture in the subterranean formation.

U.S. Pat. No. 6,511,944 above disclosed that the phosphonic acid ester used in their invention must have an R equal to tetradecyl when R' is methyl to significantly reduce volatile emissions. This methyl tetradecyl product is not commercially available and would be expected to be expensive if made commercially available. While a variety of systems are available for gelling hydrocarbon liquids for the applications discussed above, there exists a clear need in the art for a means of improving the known phosphorous gelling agent systems to include those that are readily available and low cost, but also have low volatility are not subject to decomposition under oil drilling and refinery conditions.

SUMMARY OF INVENTION

The present invention provides improved methods of using and preparing gelled liquid hydrocarbons, improved liquid hydrocarbon gelling agents and improved gelled liquid hydrocarbon compositions which meet the above described needs and overcome the deficiencies of the prior art.

The improved methods of this invention for fracturing subterranean formations using gelled liquid hydrocarbons are basically comprised of the following steps. An improved gelled liquid hydrocarbon fracturing fluid is prepared comprised of a hydrocarbon liquid, a gelling agent comprised of a ferric iron or aluminum polyvalent metal salt of a phosphoric acid ester, a proppant material, water and an amount of a delayed gel breaker effective to break the gelled hydrocarbon fracturing fluid. The phosphoric acid ester utilized in the gelling agent which minimizes volatile phosphorus in refinery distillation towers has the formula

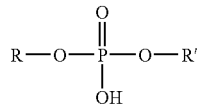

wherein R is an alkyl group having from about 8 to about 24 carbon atoms or R is a phenyl alkyl ether having from about 2 to 12 alkyl carbon atoms and 1 phenyl group and R' is an alkyl group having from about 4 to 8 carbon atoms. After the gelled liquid hydrocarbon fracturing fluid is prepared, the subterranean formation to be fractured is contacted with the gelled liquid hydrocarbon fracturing fluid under conditions effective to create at least one fracture in the subterranean formation.

It is, therefore, an object of the present invention to provide improved methods and compositions useful in treating subterranean formations as well as in other similar applications.

It is a further objective of this work to reduce volatile phosphorous based gelling agents and their decomposition products that are collected during distillation.

Other and further objects, features and advantages of the present invention will be readily apparent to those skilled in the art upon a reading of the description of preferred embodiments which follows.

DESCRIPTION OF THE PREFERRED EMBODIMENTS

Figure 1:
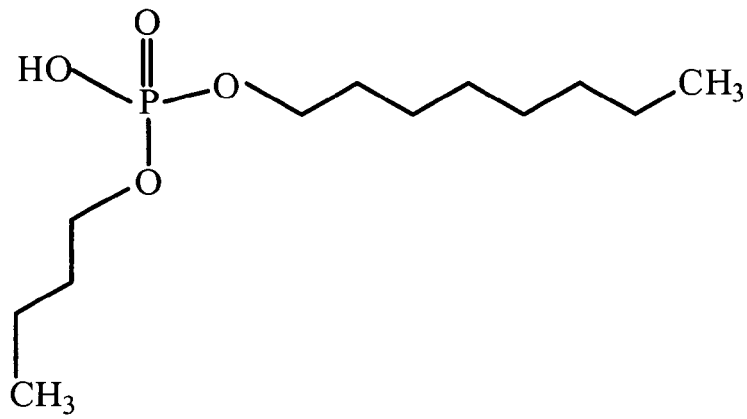
FIG. 1 is a graphical description of the products formed in the example of the novel phosphorous gelling agent that is the subject of this invention.
Figure 1:
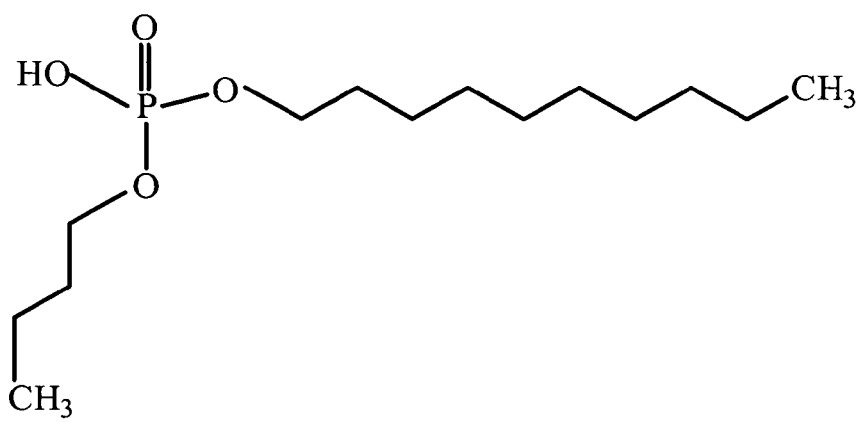
Figure 1:
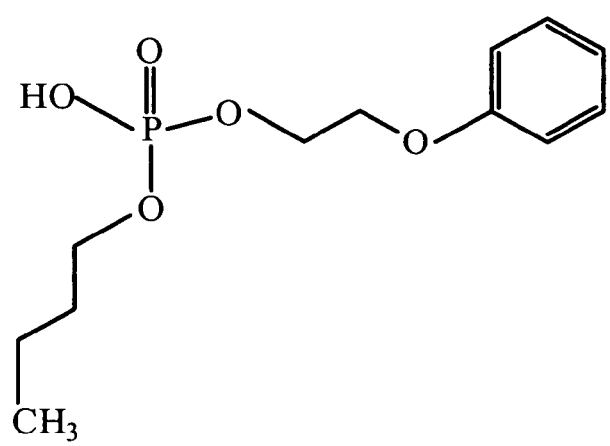

The present invention provides methods of treating subterranean formations penetrated by well bores with gelled liquid hydrocarbon fluids. The gelled liquid hydrocarbon fracturing fluids have heretofore been formed with a gelling agent comprised of a ferric iron or aluminum polyvalent metal salt of a phosphoric acid ester. The current phosphoric acid esters use suffer from the problem that they decomposes in refinery distillation towers to form volatile phosphorus which condenses on the trays of the distillation towers and causes plugging. Also, the phosphoric acid ester may itself be volatile, dependent upon its molecular weight. By the present invention, improved methods and compositions for fracturing subterranean formations with gelled liquid hydrocarbon fracturing fluids are provided wherein the gelling agent utilized is a ferric iron or aluminum polyvalent metal salt of a phosphoric acid ester with substituents that prevent volatilization and degradation of the material.

Thus, the improved methods of fracturing subterranean formations of the present invention are basically comprised of the following steps. A gelled liquid hydrocarbon fracturing fluid is prepared comprised of a hydrocarbon liquid, a ferric iron or aluminum polyvalent metal salt of a phosphoric acid ester, a proppant material, water and an amount of a delayed gel breaker effective to break the gelled liquid hydrocarbon fracturing fluid. The phosphoric acid ester has the formula

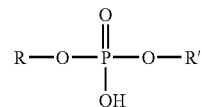

wherein R is an alkyl group having from about 8 to about 24 carbon atoms or R is a phenyl alkyl ether having from about 2 to 12 alkyl carbon atoms and 1 phenyl group and R' is an alkyl group having from about 4 to 8 carbon atoms. After the gelled liquid hydrocarbon fracturing fluid is prepared, the subterranean formation to be fractured is contacted with the fracturing fluid under conditions effective to create at least one fracture in the subterranean formation.

The hydrocarbon liquid utilized to form the gelled liquid hydrocarbon fracturing fluid can be any of the various previously used hydrocarbon liquids including, but not limited to, olefins, kerosene, diesel oil, gas oil (also known as gas condensate), fuel oil, other petroleum distillates, and certain mixtures of crude oil. Liquid hydrocarbon fracturing fluids which are specifically designed for use with CO2 are generally preferred. Such a liquid hydrocarbon fracturing fluid is commercially available from the Trysol Corporation of Sundre, Alberta, Canada under the trade name "FRACSOL™"

The gelling agent utilized for gelling the hydrocarbon liquid whereby it has a high viscosity sufficient to carry suspended proppant material and produce fractures in a subterranean formation is a ferric iron or aluminum polyvalent metal salt of a phosphoric acid ester having the formula set forth above. The polyvalent metal salt of the phosphoric acid ester is preferably produced at the well site by adding the phosphoric acid ester, and preferably, at least a stoichiometric amount of a polyvalent metal salt (preferably a ferric iron salt or an aluminum compound). In addition, if water is not already contained in the hydrocarbon liquid or added thereto as a component in a cross-linker solution or the like, water is added to the hydrocarbon liquid in an amount, for example, of about 0.05% or greater by weight of the hydrocarbon liquid. The presence of the water allows slowly water soluble or encapsulated breakers to be dissolved or released. See, for example, Smith et al. U.S. Pat. No. 5,846,915 issued on Dec. 8, 1995 which is incorporated herein by reference.

When a ferric iron salt is utilized to form the gelling agent, it is preferably selected from ferric sulfate or ferric chloride with ferric sulfate being preferred. The ferric iron salt is typically mixed with amines, surfactants and water to form a liquid cross-linking solution. An example of a commercially available ferric iron cross-linking solution is "EA-3.™." cross-linking solution sold by Ethox Chemicals, Inc. of Greenville, S.C. When an aluminum compound is utilized, it is preferably selected from aluminum chloride or aluminum isopropoxide, with aluminum chloride being the most preferred. The polyvalent metal compound utilized reacts with the phosphoric acid ester to form the hydrocarbon liquid gelling agent of this invention which gels the hydrocarbon liquid. The phosphoric acid ester is added to the hydrocarbon liquid along with the polyvalent metal source to form the gelling agent in the hydrocarbon liquid in an amount in the range of from about 0.1% to about 2.5% by weight of the hydrocarbon liquid.

As mentioned above, the phosphoric acid ester which can be utilized to form the hydrocarbon liquid gelling agent of this invention has the formula

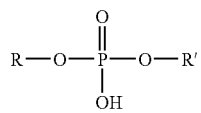

wherein R is an alkyl group having from about 8 to about 24 carbon atoms or R is a phenyl alkyl ether having from about 2 to 12 alkyl carbon atoms and 1 phenyl group and R' is an alkyl group having from about 4 to 8 carbon atoms. Techniques which can be utilized for the preparation of the phosphoric acid esters useful in accordance with this invention are, for example, described in U.S. Pat. No. 3,798,162 issued to Dickert, Jr. on Mar. 19, 1974 which is incorporated herein by reference.

Proppant materials which can be utilized in the fracturing fluids of this invention are well known in the art. For example, proppant materials such as graded sand, resin coated sand, sintered bauxite, various particulate ceramic materials, glass beads and the like can be utilized. The particular size of the proppant material employed depends on the particular formation being fractured and other variables. Generally, the proppant particle sizes are in the range of from about 2 to about 200 mesh on the U.S. Sieve Series scale.

A variety of delayed gel breakers can be utilized in accordance with the present invention to cause the gelled liquid hydrocarbon fracturing fluid to revert to a thin fluid that is produced back after fractures are formed in a subterranean formation. The gel breakers can be materials which are slowly soluble in water which, as mentioned above, is combined with or otherwise present in the hydrocarbon liquid. The breaking of the gel does not take place until the slowly soluble breakers are dissolved in the water.

One example of a delayed gel breaker is a hard burned magnesium oxide. Others include alkali metal carbonates, bicarbonates and acetates. Also included in this group are alkaline earth oxides and hydroxides, weak acids and reducing agents (with metal crosslinkers such as iron). These gel breakers can be used with encapsulating materials.

The gel breaker utilized in a water-containing gelled liquid hydrocarbon fracturing fluid of this invention is generally present therein in an amount in the range of from about 0.01% to about 3% by weight of the hydrocarbon liquid, more preferably in an amount in the range of from about 0.05% to about 1%.

A preferred method of fracturing a subterranean formation in accordance with the present invention is comprised of the steps of: (a) preparing a gelled liquid hydrocarbon fracturing fluid comprised of a hydrocarbon liquid, a ferric iron or aluminum polyvalent metal salt of a phosphoric acid ester, the phosphoric acid ester having the formula

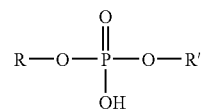

wherein R is an alkyl group having from about 8 to about 24 carbon atoms or R is a phenyl alkyl ether having from about 2 to 12 alkyl carbon atoms and 1 phenyl group and R' is a butyl group. A proppant material, water and an amount of a delayed gel breaker effective to break the gelled hydrocarbon fracturing fluid; and (b) contacting the subterranean formation with the gelled hydrocarbon fracturing fluid under conditions effective to create at least one fracture in the subterranean formation.

The ferric iron or aluminum polyvalent metal salt of the phosphoric acid ester is present in the fracturing fluid in an amount in the range of from about 0.1% to about 2.5% by weight of the hydrocarbon liquid in the fracturing fluid, more preferably in an amount in the range of from about 0.2% to about 1%. The proppant material is present in the fracturing fluid in an amount in the range of from about 1 to about 14 pounds of proppant material per gallon of hydrocarbon liquid in the fracturing fluid. As mentioned, water is added to or otherwise contained in the hydrocarbon liquid so that the delayed gel breaker utilized is dissolved in the water. The delayed gel breaker is present in the fracturing fluid in an amount in the range of from about 0.01% to about 3% by weight of the hydrocarbon liquid in the fracturing fluid, more preferably in an amount in the range of from about 0.05% to about 1%.

A preferred method of preparing a gelled liquid hydrocarbon fluid of this invention is comprised of adding a phosphoric acid ester to a hydrocarbon liquid, the phosphoric acid ester having the formula

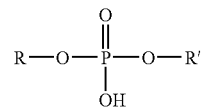

wherein R is an alkyl group having from about 8 to about 24 carbon atoms or R is a phenyl alkyl ether having from about 2 to 12 alkyl carbon atoms and 1 phenyl group and R' is an alkyl group having from about 4 to 8 carbon atoms, at least a stoichiometric amount of a polyvalent metal source selected from ferric iron salts and aluminum compounds which reacts with the phosphoric acid ester to form a ferric iron or aluminum polyvalent metal salt thereof, water and an amount of a delayed gel breaker effective to break the gelled hydrocarbon fracturing fluid.

The ferric iron or aluminum polyvalent metal salt of the phosphoric acid ester formed in the hydrocarbon liquid is present therein in an amount in the range of from about 0.1% to about 2.5% by weight of the hydrocarbon liquid, more preferably in an amount in the range of from about 0.2% to about 1%. The delayed gel breaker utilized is present in the hydrocarbon liquid in an amount in the range of from about 0.01% to about 3% by weight of the hydrocarbon liquid, more preferably in an amount in the range of from about 0.05% to about 1%.

A preferred hydrocarbon liquid gelling agent of this invention is comprised of a ferric iron or aluminum polyvalent metal salt of a phosphoric acid ester, the phosphoric acid ester having the formula

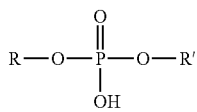

wherein R is an alkyl group having from about 8 to about 24 carbon atoms or R is a phenyl alkyl ether having from about 2 to 12 alkyl carbon atoms and 1 phenyl group and R' is an alkyl group having from about 4 to 8 carbon atoms.

A more preferred hydrocarbon liquid gelling agent is comprised of a ferric iron polyvalent metal salt of a phosphoric acid ester, the ester having the formula

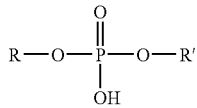

wherein R is an alkyl group having from about 8 to about 24 carbon atoms or R is a phenyl alkyl ether having from about 2 to 12 alkyl carbon atoms and 1 phenyl group and R' is a butyl group. A preferred gelled liquid hydrocarbon composition of this invention is comprised of: a hydrocarbon liquid; a gelling agent comprising a polyvalent metal salt of a phosphoric acid ester produced from a phosphoric acid ester and a ferric iron salt or an aluminum compound, the phosphoric acid ester having the formula

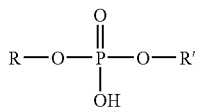

wherein R is an alkyl group having from about 8 to about 24 carbon atoms or R is a phenyl alkyl ether having from about 2 to 12 alkyl carbon atoms and 1 phenyl group and R' is a methyl group, water and a delayed gel breaker present in an amount effective to break the gel formed by the gelling agent and the hydrocarbon liquid.

As mentioned above, the delayed gel breaker can be alkaline earth metal oxides including hard burned magnesium oxide, alkali metal carbonates, alkali metal bicarbonates, alkali metal acetates, alkali metal hydroxides, amines and weak acids which are slowly water soluble or are encapsulated with a slowly water soluble or other similar encapsulating material. The delayed gel breaker can also be a reducing agent that reduces ferric iron to ferrous iron encapsulated with a slowly water soluble or other similar encapsulating material. The delayed gel breaker is present in the gelled hydrocarbon liquid in an amount in the range of from about 0.01% to about 3% by weight of the hydrocarbon liquid, more preferably in an amount in the range of from about 0.05% to about 1%.

As will be understood by those skilled in the art, the use of the improved liquid hydrocarbon gelling agents and gelled liquid hydrocarbon compositions is not limited to fracturing subterranean formations. For example, the gelled liquid hydrocarbon compositions can be used for forming gravel packs in well bores, in pipeline pigging operations and in other operations where a gelled hydrocarbon liquid which subsequently breaks into a thin fluid is utilized.

In order to further illustrate the methods and composition of the present invention, the following examples are given.

EXAMPLES

A number of phosphoric acid esters have been synthesized according to U.S. Pat. Nos. 6,342,468 and 5,110,485 the entire contents of which are incorporated by reference.

The following laboratory procedure was used in the preparation of the above esters according to U.S. Patent. Nos. 6,342,468 and 5,110,485.

The procedure for making the phosphate esters using the reactants in Table 1 is as follows:

A 4-neck reaction flask was used, equipped with a thermometer, mechanical stirrer, condenser and gas ($N_2$) inlet. 39.37 grams of tributyl phosphate and 14.96 grams of phosphorous pentoxide were added to the flask, mixed and reacted for two hours at 175° F. to produce a polyphosphate intermediate. All additions and reactions throughout the experiment were conducted under a nitrogen blanket. The polyphosphate intermediate was cooled to approximately 140° F. A mixture of 7.31 grams of Dowanol EPH and 38.36 grams of Epal 810 was then added dropwise to the polyphosphate intermediate while maintaining a temperature between about 140°-175° F. After the alcohol blend addition, the mixture was heated at 250°-260° F. for two hours. The reaction resulted in a liquid alkyl phosphate diester.

TABLE 1

Reaction Formulation

| Reactant | % |
| --- | --- |
| Tributyl Phosphate | 39.37 |
| P2O5 | 14.96 |
| Dowanol EPH | 7.31 |
| Epal 810 | 38.36 |

Where Dowanol EPH is a phenyl ether comprised of a one mole adduct of phenol.

And Epal 810 is a commercial blend of Octanol and Decanol.

The reaction products are listed in FIG. 1. These include two alkyl products and one phenyl alkyl ether product.

Low Phosphorous Analysis was conducted using the "Standard Method for Distillation of Petroleum Products at Atmospheric Pressure" Designation: D86-04b. Distillate was analyzed for Phosphorous by a contract laboratory using an ICP Analyzer (Inductively Coupled Plasma)

The distillation setup was as follows:

Gel sampled is comprised of a phosphate gelling agent, activator, #2 Diesel, and gel breaker. Sample is placed in bath for 24 hours to allow breaker to decay gel formed. 150 mls. of broken gel sample was placed in the distillation flask and heat was applied as prescribed by the method.

Distillation was repeated five times on each gel system and samples collected submitted for Phosphorous Analysis. Results are in Table 2.

TABLE 2

Distillation Phosphorous Results

| Mixture I.D. | Sample I.D. | mLs of Distillate | Phos. ppm |
|---|---|---|---|
| Mixture A | EG-2/EA-3 | | |
| | BK18-018 A | 55 | 79 |
| | BK18-018 B | 60 | 47 |
| | BK18-018 C | 62 | 71 |
| | BK18-018 D | 64 | 70 |
| | BK18-018 E | 63 | 70 |
| Mixture B | EG-2B/EA-3 | | |
| | BK18-019 A | 65 | 32 |
| | BK18-019 B | 64 | 12 |
| | BK18-019 C | 67 | 12 |
| | BK18-019 D | 72 | 21 |
| | BK18-019 E | 69 | 16 |
| Mixture C | EG-2B10K/EA-3 | | |
| | BK18-020 A | 72 | 11 |
| | BK18-020 B | 74 | 9.5 |
| | BK18-020 C | 72 | 18 |
| | BK18-020 D | 74 | 9.5 |
| | BK18-020 E | 75 | 9.9 |
| Mixture D | EG-2B10K/4071 | | |
| | BK18-021 A | 75 | 49 |
| | BK18-021 B | 73 | 20 |
| | BK18-021 C | 72 | 19 |
| | BK18-021 D | 73 | 9.5 |
| | BK18-021 E | 74 | 13 |
| Mixture E | EG-2B10K/4111 | | |
| | BK18-022 A | 79 | 9.8 |
| | BK18-022 B | 78 | 9.8 |
| | BK18-022 C | 76 | 9.7 |
| | BK18-022 D | 76 | 12 |
| | BK18-022 E | 77 | 8.9 |

ICP Phosphorous Detection Limit is approximately 10 ppm.
Sample Description
Mixture A - EG-2/EA-3 - Standard commercial product
Mixture B - EG-2B/EA-3 - New Molecule + commercial activator
Mixture C - EG-2B10K/EA-3 - New Molecule partially KOH neutralized + commercial activator
Mixture D - EG-2B10K/4071 - New Molecule partially KOH neutralized + alternate commercial activator
Mixture E - EG-2B10K/4111 - New Molecule partially KOH neutralized + alternate commercial activator It can be seen that the standard commercial product used in Mixture A had phosphorous levels in the distillate that were between 47-79 ppm. The new phosphoric acid ester of this invention used in Mixture B had phosphorous levels in the distillate between 12-32 ppm, a substantial reduction. When the new phosphoric acid ester of this invention was partially KOH neutralized as in Mixture C, the phosphorous levels in the distillate that were between 9.5-18 ppm. Some variation was seen depending on the nature of the activator in Mixtures D and E.

The entire contents including the references cited therein of all the cited patents and documents in this specification are incorporated by reference in their entirety for all purposes to the same extent as if each individual patent, patent application or publication were so individually denoted.

While the many forms of the invention herein disclosed constitute presently preferred embodiments, many others are possible and further details of the preferred embodiments and other possible embodiments are not to be construed as limitations. It is understood that the terms used herein are merely descriptive rather than limiting and that various changes many equivalents may be made without departing from the spirit or scope of the claimed invention.

What is claimed is:

1. A composition comprising a mixture of phosphate esters having the formulae:

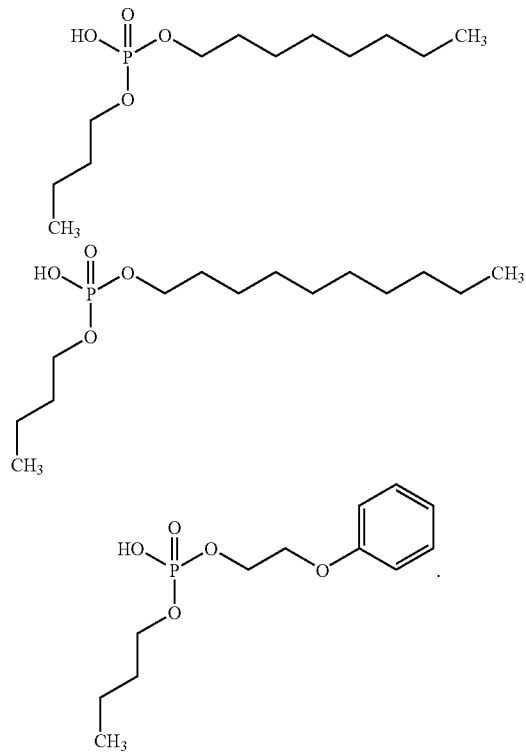

* * * * *